UNITED STATES PATENT OFFICE.

LEOPOLD WEIL, OF HAMBURG, GERMANY.

PROCESS OF PRODUCING HIGH-PERCENTAGE PURE ANTHRACENE.

1,419,186.  Specification of Letters Patent.  Patented June 13, 1922.

No Drawing.  Application filed December 21, 1921. Serial No. 524,042.

*To all whom it may concern:*

Be it known that I, LEOPOLD WEIL, a citizen of Germany, a resident of 159 Mittelweg, in the city of Hamburg, in the German Empire, have invented a certain new and useful Process of Producing High-Percentage Pure Anthracene, of which the following is a specification.

The manufacture of anthracene of high percentage from the crude anthracene furnished by the tar distilleries has been accomplished heretofore in a rather complicated manner. Thus, in accordance with one of the ordinary processes the raw material is caused to distil over with vapors of such solvents which will also absorb the impurities of the raw anthracene. Pyridine has been suggested as a suitable solvent for this purpose. But inasmuch as pyridine boils at 115 degrees centigrade, that is to say, at a temperature at which anthracene does not yet distil over, it has to be employed in superheated condition. This necessitates to combine the distilling apparatus with a superheater, thereby complicating the apparatus and considerably increasing the working expenses. In addition to this drawback there is the additional difficulty that pyridine is about ten to fifteen times as expensive as other solvents which are adapted for use according to this invention.

Though such other solvents, as paraffine oil for example, have already been suggested for the purification of anthracene, they have only been used heretofore for washing the crude anthracene by purely mechanical means. But it is well known that by working in this manner a product of only forty per cent maximum strength may be obtained, and that all contradicting statements in regard to this treatment occurring in chemical literature, have not been borne out by practical experience.

According to a crystallization process now practised for the manufacture of pure anthracene highly-molecular basic substances, such as pyridine, anilin, quinoline are used as solvents. In accordance with the process of this invention the crude anthracene is distilled along with gas oil, vaseline oil or similar hydrocarbons of petroleum which distil over at 260 to 315 degrees. The distillation may be effected at ordinary or reduced pressure. The anthracene crystallizes from the distillate. The oil remaining from the distillation is removed by suction, centrifugal action, and washing with benzine or by being squeezed out by hydraulic pressure; the anthracene produced in this manner shows 73 to 80 per cent purity. By repeating the process an anthracéne-product of higher percentages of purity may be obtained. The process of this invention is entirely different from a previous process of purification of raw material by distilling it with solvent, and by separating the components of a mixture of ace-naphthenes by operating thereon with methyl- and dimethyl-napthaline. From this process the process of this invention is differentiated by being applied to crude anthracene which shows an entirely different chemical behavior, and by the employment of hydrocarbon of petroleum as a means of effecting the distillation.

Example: 2-thousand kilograms of anthracene of about 25 per cent are distilled with 750 kilograms of gas oil of specific gravity 0.840 at a temperature of 260 to 315 degrees centigrade. By automatic feeding of the oil acting as a solvent, in the proportion of its being consumed at from 290 to 310 degrees during the distillation, provision is made of avoiding decomposition by overheating. As soon as no more anthracene crystallizes from the oil distillate the distillation is stopped. After cooling the distillate the anthracene is sucked off, is washed with benzine, and dried or it is separated by strong pressure in the hydraulic press. The solvent oil obtained by suction or by pressure may be employed over again. The product obtained in this manner contains 73 to 80 per cent of pure anthracene.

Should it be desired to produce anthracene of still higher percentages of purity, the product obtained as previously described is submitted to a new process of distillation with the solvent by which means anthracene of ninety per cent may be obtained. The new process according to this invention has the advantage, as compared with the processes heretofore practised, of effecting a great simplification and saving both as regards manner of operation as well as the apparatus required. Starting with crude material of very low cost it produces in one operation anthracene of such high degree of purity as to be suitable for the manufacture of anthraquinone and for other purposes where purity is of essential importance.

I claim:—

1. The process of producing high-percentage anthracene which consists in distilling crude anthracene with hydrocarbons of petroleum of about three hundred degrees boiling point, crystallizing the anthracene from the distillate, and separating the crystallized mass from the liquid.

2. The process of producing high-percentage anthracene which consists in distilling crude anthracene with gas oil, collecting the distillate, causing the anthracene to crystallize from the distillate, and separating and purifying the crystals.

3. The process of producing high-percentage anthracene which consists in distilling crude anthracene with hydrocarbons of petroleum, such hydrocarbon boiling at from about 260 to about 315 degrees centigrade, collecting the distillate, crystallizing the anthracene from the distillate and separating and washing the crystals.

4. The process of producing anthracene of high percentage which consists in distilling crude anthracene at reduced pressure with petroleum hydrocarbons of from about 260° C., to about 315° C. boiling point, crystallizing the anthracene from the distillate and separating and purifying the crystals.

5. The process of producing anthracene of high percentage which consists in distilling crude anthracene at a pressure not exceeding atmospheric pressure with petroleum hydocarbons of from about 260 to approximately 315 degrees boiling point, collecting the distillate, crystallizing the anthracene from the distillate, and separating the crystals from the liquid, and redistilling the crystals with the petroleum hydrocarbons, and collecting the crystals from the new distillate.

6. The process of purifying anthracene which consists in distilling crude anthracene with liquid highly boiling petroleum hydrocarbons, adding new quantities of such liquid hydrocarbons in the proportion of their consumption during distillation, and crystallizing the anthracene from the distillate.

The foregoing specification signed at Hamburg.

Dr. LEOPOLD WEIL.

In presence of two witnesses—
 I. Christ. Hufermann,
 A. Springer.